United States Patent [19]

Lien et al.

[11] Patent Number: 5,386,567
[45] Date of Patent: Jan. 31, 1995

[54] HOT REMOVABLE AND INSERTION OF ATTACHMENTS ON FULLY INITIALIZED COMPUTER SYSTEMS

[75] Inventors: Yeong-Chang Lien, Armonk, N.Y.; Hironao Sone, Yokohama, Japan; Kazuo Sekiya, Tokyo, Japan; Yoshihisa Kanada, Tokyo, Japan

[73] Assignee: International Business Machines Corp., Armonk, N.Y.

[21] Appl. No.: 960,753

[22] Filed: Oct. 14, 1992

[30] Foreign Application Priority Data

Jan. 20, 1992 [JP] Japan .................................. 4-007527

[51] Int. Cl.⁶ .......................... G06F 11/30; G06F 9/44
[52] U.S. Cl. .................................... 395/700; 395/575; 364/DIG. 2; 364/949.4; 364/975.2; 364/929.4
[58] Field of Search ............... 395/500, 575, 650, 700, 395/275

[56] References Cited

U.S. PATENT DOCUMENTS

| | | | |
|---|---|---|---|
| 5,014,193 | 5/1991 | Garner et al. ...................... | 395/275 |
| 5,165,018 | 11/1992 | Simor ................................ | 395/300 |
| 5,220,654 | 6/1993 | Benson et al. ..................... | 395/275 |
| 5,237,690 | 8/1993 | Bealkowski et al. ............... | 395/700 |
| 5,269,011 | 12/1993 | Yanai et al. ........................ | 395/425 |

*Primary Examiner*—Kevin A. Kriess
*Attorney, Agent, or Firm*—Robert S. Babayi

[57] ABSTRACT

A computer having slots for attachment of expansion adapters contains means enabling the system formed by the computer and attached adapters to reconfigure automatically, when an adapter is either inserted into an empty slot or removed from an occupied slot, while the system is fully powered and in an application running state. Insertion of an adapter into an empty slot is detected by an adapter detection mechanism. The mechanism signals a programmed resource manager element in the computer, via an interrupt or the like, and the resource manager then sequences the computer and inserted adapter through a series of mechanical and electrical reconfiguring operations. In these operations, the adapter is physically locked into place relative to the slot, supplied with power from a source in the computer, and signal conduction paths through the slot are activated. Thereafter, attribute information stored by the adapter is read out to the computer and the computer conducts a setup process to modify its configuration information to establish proper communication levels and addresses for the adapter commensurate with then active resources of the system. To remove an installed adapter, a user issues an adapter removal request to the resource manager, via an adapter removal button. In response to such request, the resource manager checks the running state of the adapter. If a data transfer is being conducted relative to the adapter, further operation in response to the request is delayed until the transfer is completed. When the request can be handled, the resource manager electrically isolates and mechanically releases the adapter, allowing the user to remove it.

19 Claims, 7 Drawing Sheets

[Document Name] Drawing
[Figure 1]
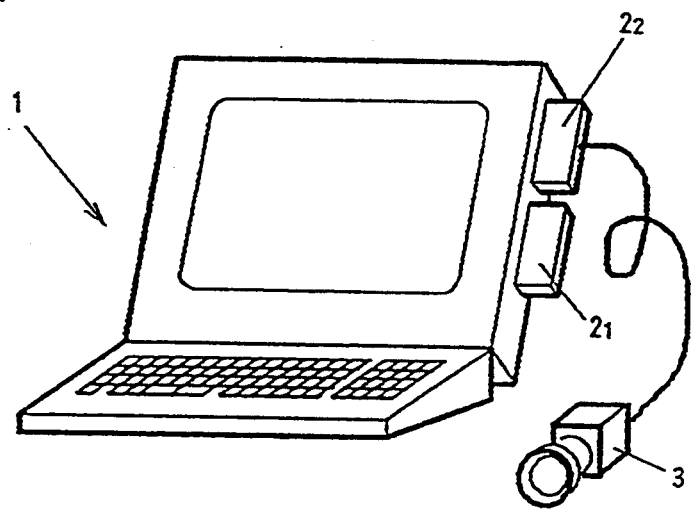
[Figure 2]
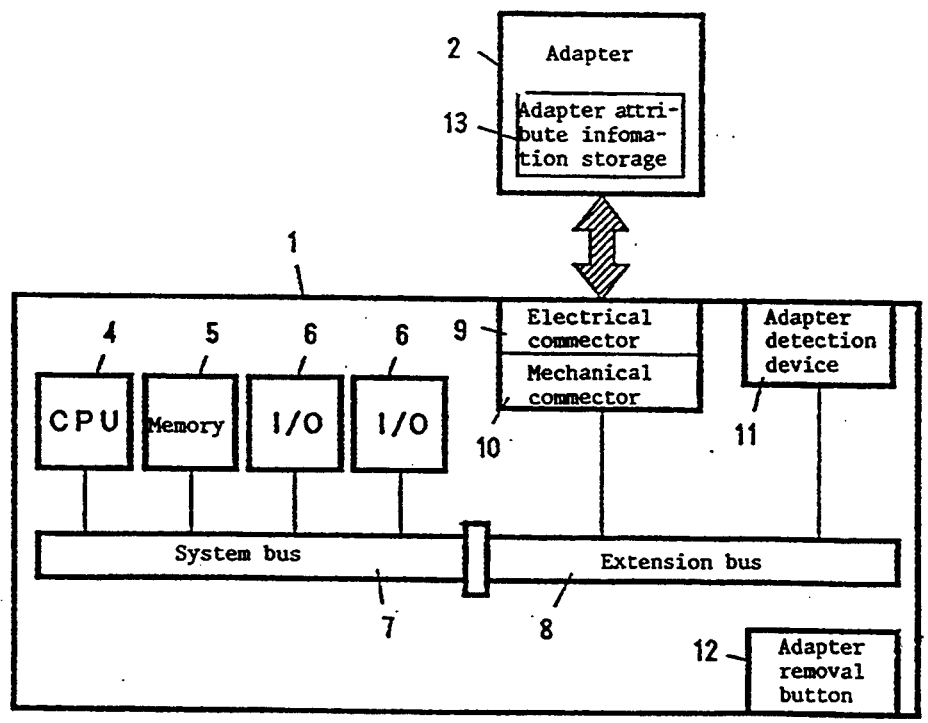

[Figure 3]
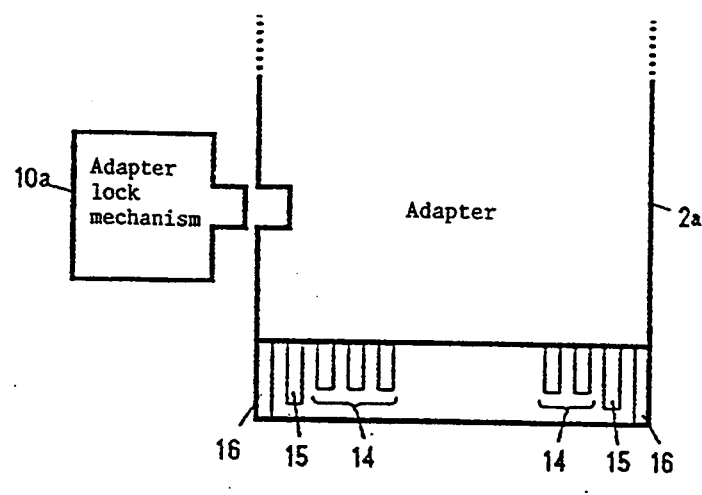
[Figure 4]
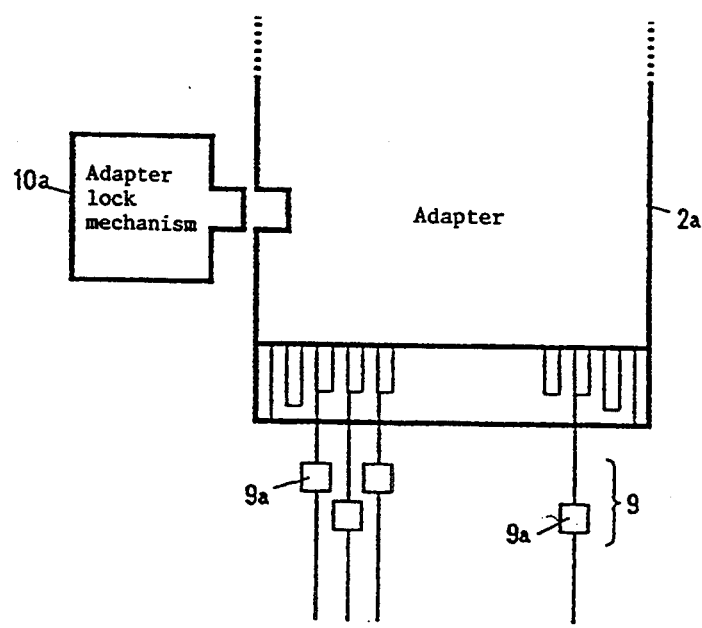

[Figure 5]
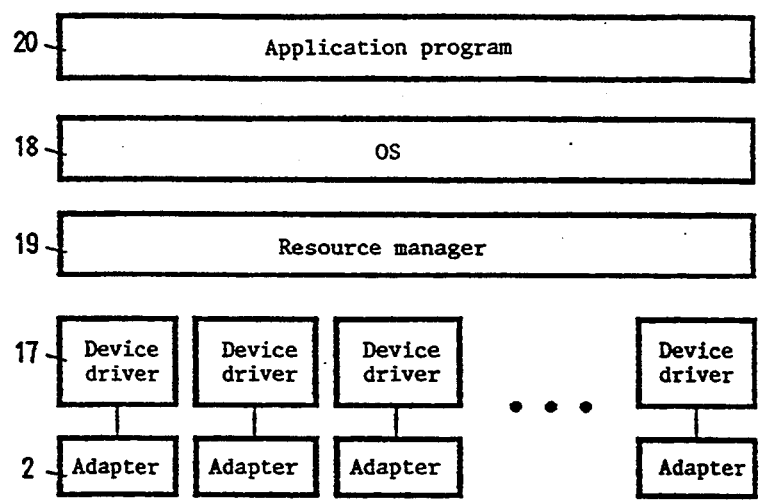
[Figure 6]
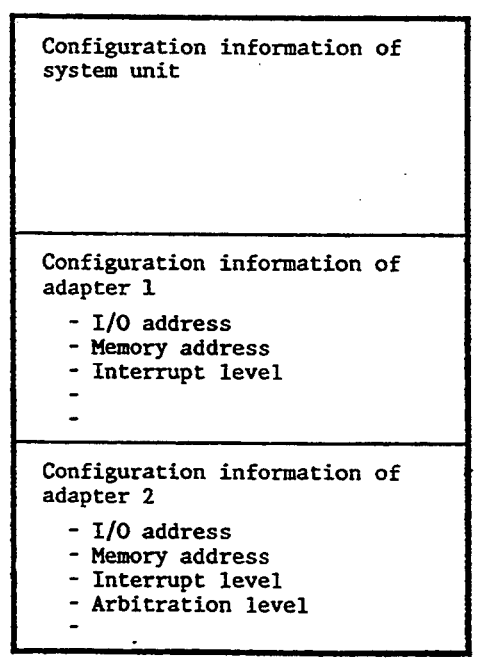

[Figure 7]
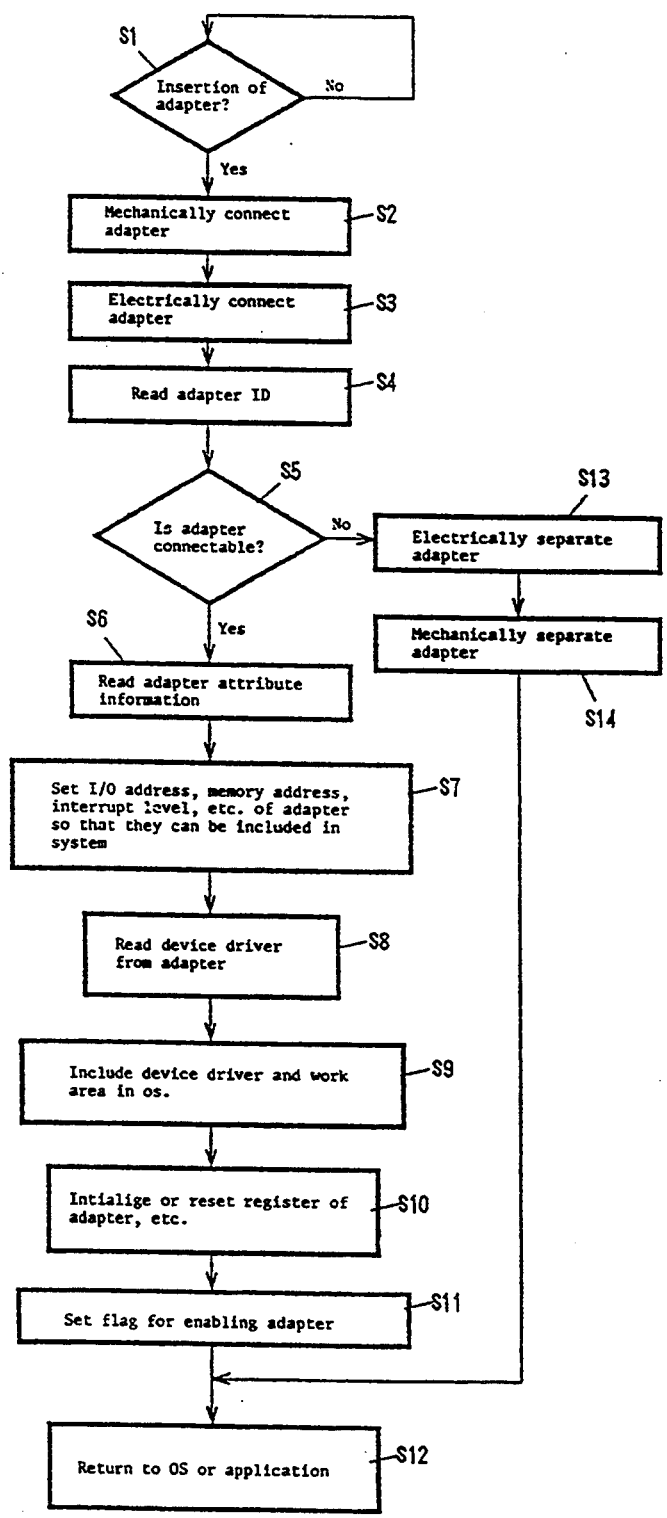

[Figure 8]
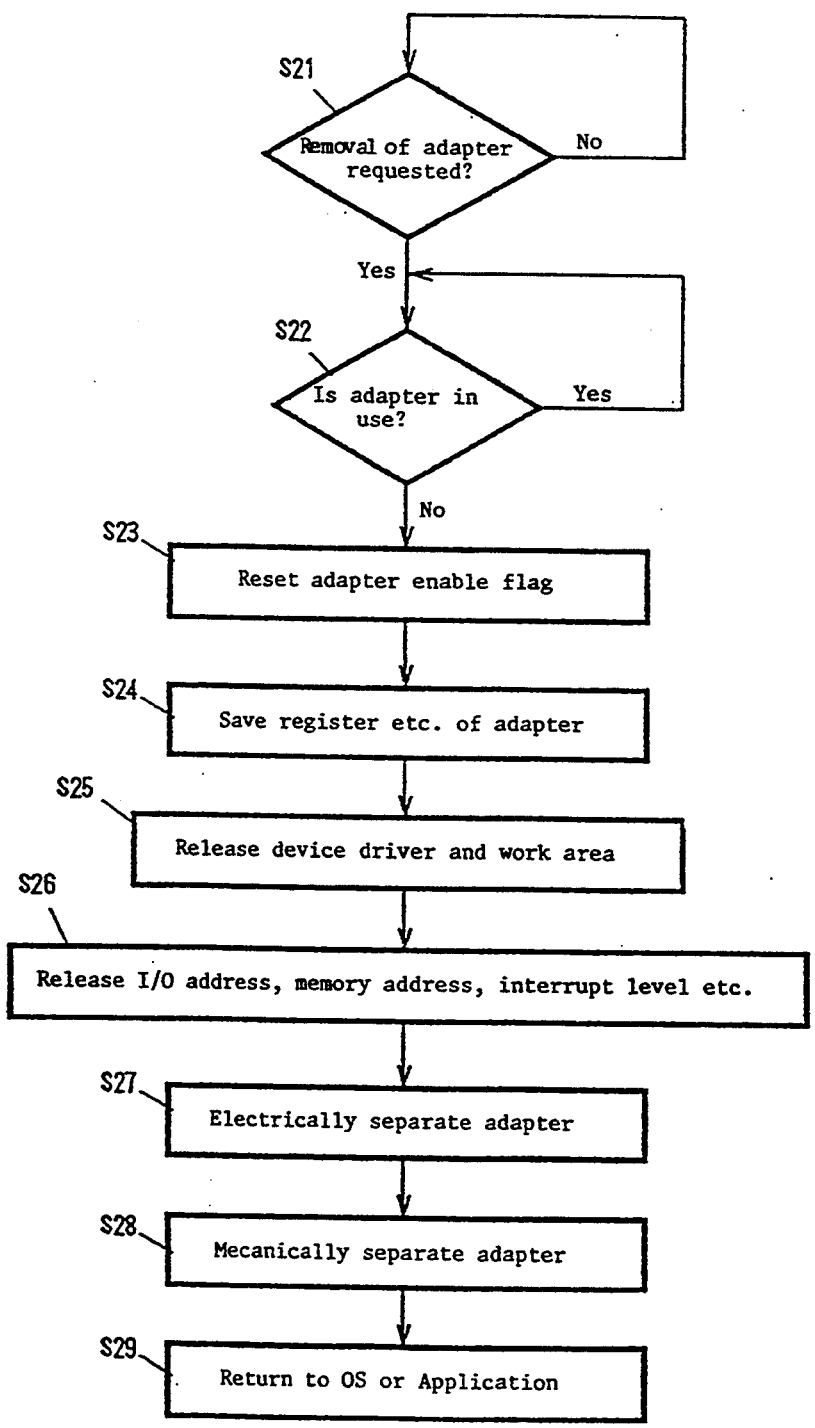

[Figure 9]
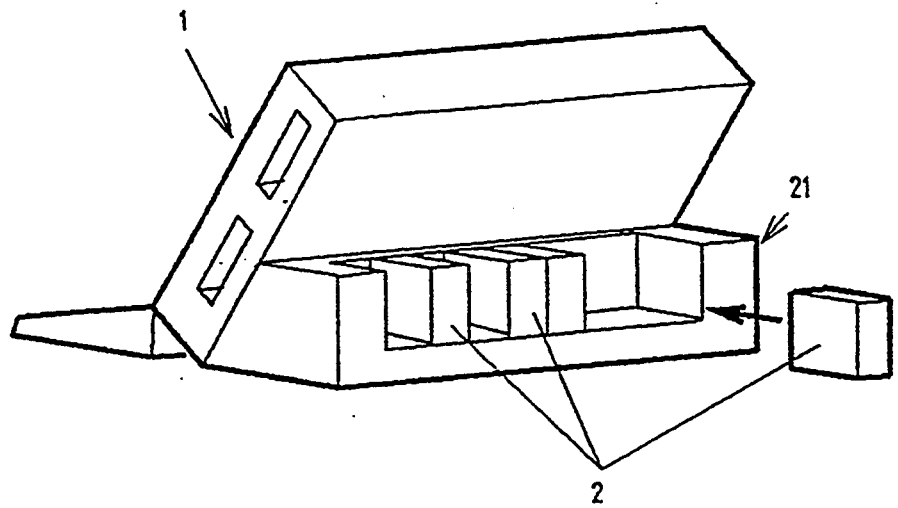
[Figure 10]
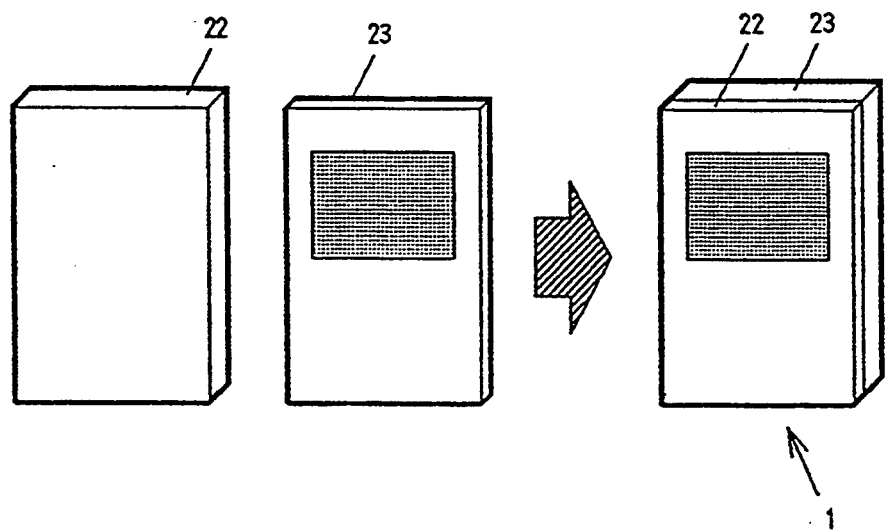

[Figure 11]
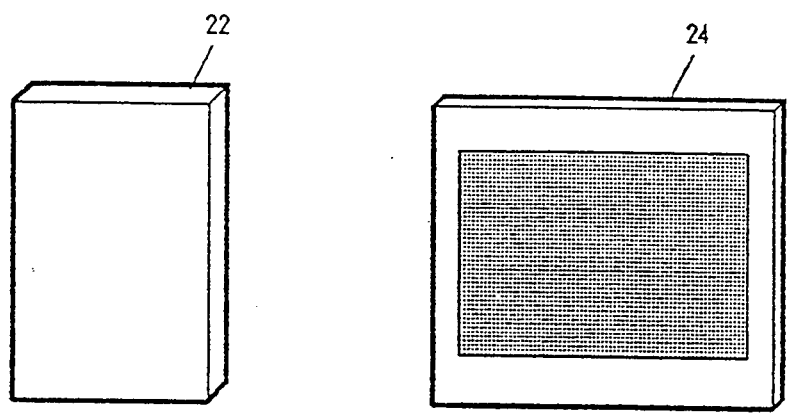
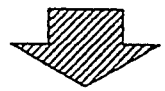
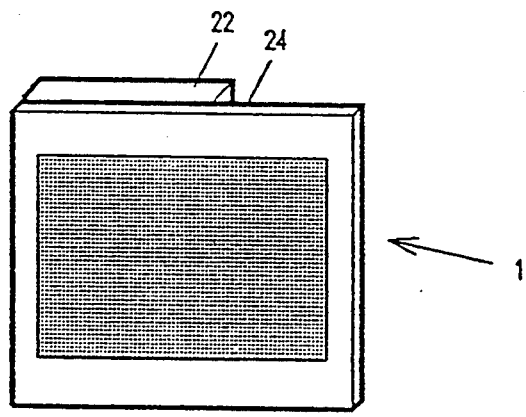

HOT REMOVABLE AND INSERTION OF ATTACHMENTS ON FULLY INITIALIZED COMPUTER SYSTEMS

FIELD OF THE INVENTION

This invention relates to self configuring small computer systems (personal computers, workstations, etc.) with dynamically connectable and disconnectable attachments.

RELATED PATENT APPLICATION

U.S. patent application Ser. No. 07/911564 (JA9-91-025) by N. Harada et al, filed Jul. 8, 1992, and assigned to the assignee of this application.

BACKGROUND OF THE INVENTION

Contemporary personal computer systems have capabilities for automatically adapting to changes in connection status at their peripheral attachment ports. The Harada et al application, listed above under "Related Application", discloses an arrangement of this kind in which the system automatically reconfigures as device adapters are attached to and disconnected from the system. However, adapter connections in that arrangement are static in the sense that they are not changeable while the system is up and running. Thus, if the system is running an application calling for data exchange with an adapter not currently attached, the system would have to be powered off while the adapter is attached, repowered on, rebooted, and resequenced to the application state it was in before power was turned off.

From the perspective of a computer system user, the foregoing reconfiguration operation would be more efficient if it could be accomplished dynamically, while the application is being run, without turning off system power and without having to reboot the system and reinstate the application process.

Dynamic attachment and disconnection of adapters to running systems, also known as "hot plugging" and "hot unplugging", is known in the art. However, applicants are presently unaware of any teaching in the art of having the system reconfigure automatically, in response to such actions, in a manner which is essentially transparent to applications in process and substantially transparent to system users.

There is a need for providing such autoconfiguration capabilities, which the present invention seeks to fulfill.

OBJECTS OF THE INVENTION

An object of the invention is to provide a method and associated means for conditioning a computer system to adapt automatically to actions associated with hot plugging and hot unplugging of adapters, in a manner which is substantially transparent to system users and applications undergoing processing at the time such actions occur.

Another object is to provide such method and means with facilities for coordinating the physical and electrical release of an adapter being unplugged with I/O processes directed to the same adapter, so as to prevent the removal of that adapter from interfering with any I/O processes being conducted relative to the adapter at the time removal is attempted.

A further object is to provide such method and means with capabilities for interacting with an adapter being plugged in, so that the adapter attribute information needed by the system for revising its internal configuration is directly derivable from the respective adapter.

SUMMARY OF THE INVENTION

In accordance with the invention, these objects are realized by providing the system with a detection mechanism, that detects insertion or removal of an adapter at any connection port, coupling control means for physically and electrically completing connection between the system and adapter, and "resource manager" means for monitoring the running state of an adapter undergoing insertion or removal so as to properly coordinate operations of the coupling control means with I/O operations being conducted between the system and adapter, so that I/O operations relative to an adapter being plugged in are not started until the adapter is properly and fully connected, and connection to an adapter being unplugged is not prematurely broken while an I/O operation is under way relative to that adapter.

When an adapter is plugged into the system, the detection mechanism indicates that occurrence to the resource manager means, via an interrupt or the like, and the latter unit actuates the coupling means to secure physical connection and complete electrical connection between the system and the adapter. The securing function may include locking the adapter in place so as to prevent its physical removal. When these connections are properly secure and complete, the resource manager performs the operations required to adjust the internal configuration of the system to conform to the presence of the adapter. In accordance with the invention, these operations may include: reading adapter/device attribute information stored on the adapter, setup of associated configuration information in system registers, assignment of memory address space to the adapter, and activation of device drivers if needed; so that an application program running on the system just prior to the insertion can be immediately and automatically prepared to address and use the adapter for I/O transfers.

When a user wants to remove an adapter, he or she signals the system (e.g. via an "adapter remove" switch, or by an equivalent request signal). The "removal request" associated with that signal is transferred to the resource manager means, which then checks the running state of the adapter. If the adapter is in a running state consistent with removal, the resource manager completes the actions for disconnecting the adapter and isolating it from the system, and then signals the user that the adapter can be physically removed. If the adapter is in a running state inconsistent with removal (e.g. if an I/O transfer is being conducted between the system and the adapter), the resource manager delays completion of the removal actions until the inconsistent running state ends. When the adapter is removed, the device driver is either deactivated or conditioned to conform to the removal (so that if an I/O request is issued relative to a device that has been effectively removed, the driver is incapable of responding, and an indication that the device is unavailable will be returned to the requesting application or other program).

Accordingly, an adapter can be inserted or removed while the computer system remains fully operational. In addition, handling of adapters becomes very easy because any type of adapter is automatically incorporated in the system for the user.

These and other features, effects, advantages and benefits associated with the present invention may be more fully understood and appreciated by considering the following description and claims.

BRIEF DESCRIPTION OF THE DRAWINGS

FIG. 1 is a perspective view showing the appearance of an embodiment of the invention, and its state in use.

FIG. 2 is a block diagram showing internal configuration of the embodiment.

FIG. 3 illustrates a connection area of an adapter structured in accordance with the invention.

FIG. 4 illustrates details of connection between the adapter area shown in FIG. 3 and corresponding elements in a computer system, in accordance with the invention.

FIG. 5 illustrates system software associated with the automatic system configuring operation of the invention.

FIG. 6 illustrates the form of system configuration information used in the embodiment of the preceding figures.

FIG. 7 is a flowchart illustrating the sequence of system operations evoked when an adapter is hot plugged into a system port in accordance with the invention.

FIG. 8 is a flowchart illustrating the sequence of system operations induced when a currently attached adapter is unplugged.

FIG. 9 is a perspective view of an alternate embodiment of the invention in which a portable computer is dynamically connectable to and detachable from an adapter associated with a docking station or expansion unit.

FIG. 10 is a block diagram of another alternate embodiment of the invention.

FIG. 11 is a diagram illustrating a variation of the arrangement shown in FIG. 10.

DETAILED DESCRIPTION

FIG. 1 shows the external appearance of a typical system environment in which the invention can be applied to advantage. Portable computer 1 has connection ports/slots, not shown in this figure, through which adapters 2, typified by memory adapter $2_1$ and video camera adapter $2_2$, are attached to the computer. It is understood that these slots are general purpose, and can attach to various other adapters (e.g. communication adapters) in addition to the adapters $2_1$ and $2_2$.

FIG. 2 schematically illustrates internal elements of the computer 1 and a typical adapter 2, including elements associated with the operations of this invention.

Within the computer, central processing unit (CPU) 4, memory 5, and I/O devices 6 (one of which may be the keyboard of the computer) are attached to a system bus 7; and inter-communicate via that bus. Extension bus 8, which is connected to the system bus 7, couples to electrical connector 9, mechanical connector 10 and adapter detection device 11. An adapter removal signalling button 12, whose usage and operation are explained later, is located on the computer housing; typically near the above-mentioned slots for adapter attachment.

The adapter contains an attribute information store 13, and a not-shown logical functional block associated with the adapter operations (for example, a memory block in the case of a memory adapter). Attribute information store 13 stores adapter identity (ID) information and other information.

FIG. 3 shows a "connection area" portion 2a, of the adapter 2 in FIG. 2, which is formed to plug into a slot of computer 1. Along the end at which electrical contact is made with the computer, area 2a has signal line terminations 14, power supply line terminations 15, and adapter detection line terminations 16. When area 2a is inserted into a slot of the computer, line terminations 16 contact corresponding line terminations in the slot which extend to adapter detection device 11 (FIG. 2). This enables device 11 to detect that an adapter has been inserted into the respective slot. Upon detecting this, device 11 actuates mechanical connector 10 (FIG. 2) to drive lock mechanism 10a (FIG. 3) into a recess in adapter portion 2a, thereby physically locking the adapter into connective relation with the computer.

Power transfer line terminations 15 connect via corresponding power transfer lines in the computer to a source of power serving the computer. Signal line terminations 14 connect via corresponding lines in the computer to switches 9a (FIG. 4) which are part of electrical connector 9 (FIG. 2). Contacts in switches 9a, which are capable of electrically connecting adapter lines 14 and corresponding signal lines in computer 1, are controlled by a programmed resource manager in the computer (FIG. 5). These contacts are open when a computer slot is empty and are closed by the resource manager when an adapter is inserted into the slot.

Adapter removal button 12 (FIG. 2) is used by a computer user prior to attempting to remove an adapter from a computer slot. Operation of this button prompts the above-mentioned programmed resource manager to perform certain signalling operations (described later) relative to the adapter, interrupt signal line contacts 9a, and release lock mechanism 10a. Release of the lock mechanism frees the adapter for removal from the respective slot. Those skilled in the art appreciate that the function of button 12 can be performed by other than a dedicated button; e.g. by a special combination of keys on the computer keyboard.

It is understood that elements 9-12 as shown in FIG. 2 are duplicated for each computer slot; so that for each slot there is the equivalent of an electrical connector 9, mechanical connector 10, and button 12, and so that adapter detector 11 receives separate inputs relative to each slot from respective elements.

FIG. 5 shows the software configuration of computer 1. Device drivers 17, prepared for attached adapters 2, interface through resource manager 19 with operating system (OS) 18, and via the latter with one or more application programs 20. Resource manager 19 monitors insertion and removal of adapters 2, and manages system configuration information (FIG. 6) and (activation and deactivation of) device drivers 17. Operations of resource manager 19 will be explained later in detail with reference to FIGS. 7 and 8. Application program 20 is executed under support of operating system 18.

Next, specific operations of the resource manager in this embodiment are explained. Operations associated with adapter insertion are explained with reference to the flow diagram of FIG. 7, and operations associated with adapter removal are explained with reference to the flow diagram of FIG. 8. In each of these operations it is assumed that the computer is fully powered up and initialized, and that it is either running or immediately capable of running an application program.

Referring to FIG. 7, insertion of an adapter, into an empty slot, is detected at step S1. This action is indicated to the resource manager 19 through a means such as an interrupt. In response, resource manager 19 operates lock mechanism 10a to lock the adapter physically in the inserted position (step S2). At the same time, power is supplied to the adapter 2, and then electrical signalling connections between the adapter and computer are completed (step S3). This two-stage completion of power and signal connections suppresses generation of noise or the like, in the signal circuits of the computer, which otherwise could occur during hot plugging insertion. In this regard, it may be noted (see FIG. 3) that adapter line terminations 14, 15 and 16 are of different lengths, so that adapter insertion is detectable before power terminations engage, and power terminations engage before signal line terminations connect; whereby power transfer to the adapter can stabilize before signal conduction paths are completed.

After completion of mechanical and electrical connections, the adapter's identity ID is read out (from the adapter's attribute information, FIG. 2) and checked to determine whether or not the adapter is of a type supported for connection in this manner (steps S4 and S5). If it is so supported, further necessary adapter attribute information is read out from the adapter's attribute information store 13 (step S6).

This attribute information is used by the resource manager to set up configuration information elements tailored to the respective adapter (I/O address, memory address, interrupt level, etc., step S7), to read a device driver (or drivers) 17 from the adapter, that is/are needed for operating the respective adapter (step S8), to install such driver(s) and an appropriate work area therefor into the computer's operating system (step S9), to initialize or reset (a register in) the adapter (step S10), and to set a flag or the like in the adapter activating it for operation relative to the computer (step S11). The interrupt level established in step S7 is needed to ensure that the respective adapter does not compete inappropriately with other system resources. Upon completing the foregoing operations, the resource manager transfers control to OS 18 or an application program 20, via an interrupt or the like (step S12).

If the determination at step S5 is that the adapter is one which either is not connectable or connectable but not usable because of the system configuration (insufficient mounted memories, too small capacity of a necessary file device, or no necessary input/output device), the resource manager electrically and mechanically releases the adapter (steps S13 and S14) so that it can be physically removed by the user. If appropriate an indication is given to the user to prompt the removal.

Removal of an installed adapter is explained with reference to FIG. 8. As noted earlier, before physically removing the adapter the user operates adapter removal button 12 (FIG. 2) to signal a request for such action. This signal is transmitted to the resource manager 19 (step S21). Although, the user's removal request in this embodiment is signalled by operation of a dedicated removal button 12, it should be understood that the same function could be performed by operation of another device; e.g. a selected key combination on the computer keyboard or a button on an appropriately positioned mouse., or by a signal from an application program representing an adapter removal request. After receiving the adapter removal request, the resource manager 19 checks whether or not the adapter 2 is in use (step S22). If the adapter is in use, the manager is caused to wait until completion of use ("Yes" return in step S22).

When the adapter is no longer in use, the resource manager performs operations for adjusting the computer configuration before allowing the adapter to be removed. Incidental to such operations, if appropriate or required, the resource manager resets the adapter enabling flag (step S23) that was set during insertion step S11 (FIG. 7), and saves the register states (step 24) that were set during insertion step S10 (FIG. 7) in a permanent form (e.g. in a nonvolatile memory in the computer or on a secondary storage device such as a disk). Subsequently, the resource manager releases the associated device driver and driver work area (step S25), frees up the I/O address, memory address, interrupt level and the like which the adapter has used (Step S26), electrically isolates and mechanically releases the adapter (opens switches 9a and releases lock mechanism 10a, FIG. 3), and transfers control to the OS or application program (steps 27-29). The actions to electrically isolate and mechanically release the adapter are performed in sequence, in order to avoid generation of noise and the like on signal lines in the computer when the adapter is physically removed. Mechanical release disengages lock mechanism 10a, so the user can freely remove the adapter.

Variations of the foregoing embodiment are described next with reference to FIGS. 9-11.

In the variation of FIG. 9, portable computer 1 is attachable to an expansion unit (docking station) 21, which has connection slots for multiple adapters 2, and circuitry equivalent to elements 9-12 (FIG. 2) for linking those slots to the connection interface at which the computer attaches to unit 21. In this case, unit 21 is powered separately (typically, by DC power generated from an AC source). As before, the resource manager 19 (FIG. 5), which is a programmed element in the computer, operates to detect insertion and removal of adapters relative to slots in either the computer or the expansion unit 21, and to automatically reconfigure the system to conform to the insertion or removal condition.

FIGS. 10 and 11 show a portable computer system formed by connecting a system unit 22 with modular LCD (liquid crystal display) units 23, 24 of different sizes; e.g. for displaying images (or portions of images) with various magnifications. As suggested in FIG. 10, LCD unit 23 could have overall dimensions the same as those of the system unit and a relatively small viewing area; whereas, as shown in FIG. 11, LCD unit 24 could have larger overall dimensions and viewing area than unit 23.

Thus, LCD unit 23 might be used for presenting a "condensed" view of all or part of a page of printed matter, while LCD unit 24 could be used for presenting a magnified view of all or part of the image displayed by unit 23. In this example, the system unit and LCD unit 23 could each have letter size dimensions (e.g. 8.5 by 11 inches), and the LCD units 23 and 24 could contain differently configured LCD arrays, attribute stores, display controllers and display drivers arranged to form their respective viewing images.

Upon "hot plug" attachment to any of the display units, the resource manager in the system unit shown in these figures would reconfigure as before, using attribute information and display driver information stored by the respective display unit, and the reconfigured system would then form a displayed image having overall dimensions and printed characters sized in accordance with attributes of the respective display unit.

The display units shown in FIGS. 10 and 11 might also be arranged to included tablet functions, to which the system unit would adjust in reconfiguring.

What is claimed is:

1. A computer system, having a main housing with one or more slots for connection of peripheral device adapters, and comprising one or more adapters insertable into said slots, said system also containing means for storing configuration information enabling said system to cooperate with said adapters when they are attached to said one or more slots, an arrangement for dynamically reconfiguring said computer system when an adapter is inserted into an empty one of said one or more slots, or when an adapter is removed from one of said slots, while the system is fully powered and initialized for running application programs, said arrangement comprising:

means interactive with users of said computer system and coupled to said slots for controllably permitting removal of a said adapter from any one of said slots containing an adapter, while said system is actively powered and fully initialized and without requiring rebooting or reinitialization of said system; said interactive means including means operative during removal of a said adapter from said any one slot for adjusting said stored configuration information to reflect removal of said adapter from the respective slot;

means coupled to said slots for detecting insertion of a said adapter into a formerly empty one of said slots; and means cooperative with said insertion detecting means for altering said stored configuration information to conform to the presence of said inserted adapter in said formerly empty one of said slots.

2. The dynamic reconfiguration arrangement as claimed in claim 1 wherein said means cooperative with said insertion detecting means comprises:

means responsive to detection of insertion of a said adapter, into a said formerly empty one of said slots, for controlling the adapter inserted into said formerly empty slot to exchange information signals with said computer system, including information signals representing attribute information stored by said inserted adapter.

3. The dynamic reconfiguration arrangement as claimed in claim 1 having one or more user operated switch elements associated with said slots for enabling a user of said computer system to signal intention to remove an adapter from one of said slots; said intention signal when activated by a said user prompting said means interactive with said users to temporarily prevent removal of said adapter from the respective any one of said slots, and to delay said adjusting of said stored configuration information relative to the respective slot, until said computer system has completed any data transfer operations that were being conducted relative to said respective slot when intention signal was activated.

4. The dynamic reconfiguration arrangement as claimed in claim 3, having means located in the vicinity of each of said slots for releasably locking adapters inserted into respective said slots into physically secure coupling with respective slots; said means for releasably locking being controllable by said means cooperative with said insertion detecting means to lock an adapter that is being inserted into a said respective slot prior to said altering of said stored configuration information; said means for releasably locking also being controllable by said means interactive with users of said computer system, in response to activation of said intention signal relative to said respective slot, to maintain said locking means in engagement with the adapter in said respective slot until any operation started relative to the respective slot prior to activation of said intention signal has been completed, and thereafter to release an adapter for removal from said respective slot.

5. The dynamic reconfiguration arrangement of claim 2 wherein said computer system receives interruption signals at plural different interrupt priority signalling levels from components of said system, and said computer system contains a memory subsystem and a multichannel direct memory access controller, and a bus coupled to said slots which is accessible to adapters plugged into said slots via a predetermined arbitration procedure; and wherein:

said attribute information stored by each said inserted adapter includes an identification number of the respective adapter, and said information signals exchanged with each said inserted adapter include information transferred from said computer system to registers in the respective adapter defining an available interrupt priority signalling level to be used by the respective adapter for requesting interruption of the computer, an arbitration level to be used by the adapter for competing with other system resources for use of said bus, a designation of a direct memory access channel through which information is to be subsequently transferred between the respective adapter and said storage subsystem, information defining the location of a register on the respective adapter which can be addressed as a discrete device, address information defining the mapping of locations in a memory in said adapter into the aggregate memory addressing space of said storage subsystem, adapter state information retained by said computer system in a non-volatile register, for enabling said computer system to resume and restart operations partially completed relative to said respective adapter prior to its last removal from a said slot when the adapter is reinserted into a said slot, and information identifying one or more device drivers for said respective adapter and/or devices controlled by said respective adapter.

6. The arrangement of claim 5 wherein said device drivers are transferred during initial installation of a said respective adapter from said respective adapter into a storage unit peripherally attached to said computer system.

7. The arrangement of claim 1 wherein adapters insertable into said slots include adapters integral to one or more display units.

8. The arrangement of claim 7 wherein said one or more display units have different dimensions allowing for providing display images of different sizes to said users of said computer system.

9. A computer having one or more slots for holding one or more expansion adapters, comprising:

means for detecting insertion of a said adapter into a said slot, means for mechanically locking a said inserted adapter into said slot in response to a detection signal from said means for detecting insertion, means for supplying power to said adapter in response to a detection signal from said means for detecting insertion, means for connecting said inserted adapter and said slot for interchanging information signals in response to a detection signal from said means for detecting insertion, means for exchanging predetermined information signals with said inserted adapter in response to a detection signal from said means for detecting insertion, means for modifying configuration information of said computer to prepare said computer and adapter for cooperating as a system, means for requesting removal of a said inserted adapter from a said slot, means responsive to said request for removal for exchanging predetermined information with the respective said inserted adapter, said information being useful to modify said system configuration information to conform said system to the removal of said respective adapter, means for shutting down signal communication between said respective adapter and said slot in response to said request, means for disconnecting power from said respective adapter in response to said request, and means for releasing mechanical locking of said respective adapter to said slot in response to said request so as to free said adapter for removal from said slot.

10. A computer as claimed in claim 9, wherein said means for requesting removal of said expansion adapter from said slot comprises an adapter removal button.

11. An expansion adapter for insertion into an expansion slot of a computer system, said adapter comprising:
means for performing a function to be expanded,
storage means for storing attribute information characteristic of the respective adapter that is necessary for enabling said computer to reconfigure automatically in conformance to said respective adapter when said respective adapter is inserted into said expansion slot, and
a connector with plural conductors for making electrical contact with said computer system via said expansion slot; said connector conductors including:
an insertion indicating conductor for enabling said computer to detect insertion of said respective adapter into said expansion slot,
a power supply conductor for supplying power from said computer to said expansion adapter via said expansion slot, and
signal transfer conductors for conveying signals between said respective adapter and said computer via said expansion slot;
said conductors being designed to contact corresponding conductors of said computer system in said expansion slot, and also being of different lengths such that, during insertion of said adapter into said expansion slot, said insertion indicating conductors make contact with corresponding conductors in said expansion slot before either said power supply conductor or said signal transfer conductors contact their respective corresponding conductors; and said power supply conductor makes contact with a corresponding conductor before any of said signal conductors make contact with their corresponding conductors.

12. An expansion adapter as claimed in claim 11, wherein said computer system receives interruption signals at plural different interrupt priority signalling levels from components of said system, and said computer system contains a memory subsystem and a direct memory access controller controlling access to said subsystem through a plurality of channels, and a bus coupled to said slots which is accessible to adapters plugged into said slots via a predetermined arbitration procedure; and wherein:

said attribute information includes an identification number of said adapter, information on an available interrupt level to be used by said adapter when interrupting said computer, an arbitration level to be used by said adapter for arbitrating for access to said bus, a direct memory access channel to be used for conveyance of data between said adapter and said memory subsystem, information on an I/O register which can be set by a program, address information on a memory on said adapter, information on a register in said computer to be used for saving information about the state of said adapter when last removed from a said slot, which saved information can be used by said computer to resume and restart processes that the adapter was performing when last removed upon subsequent reinsertion of the respective adapter into a slot, and information on one or more device drivers for said adapter.

13. An expansion adapter as claimed in claim 12 storing one or more device drivers and adapted for supplying said device drivers to said computer when the adapter is inserted into a said slot.

14. An expansion adapter as claimed in claim 11 which is an integral part of a display unit.

15. An expansion adapter as claimed in claim 14, wherein said display unit comprises a display screen and a display control section which interfaces between said integral adapter and said display screen.

16. An apparatus for system reconfiguration of a computer that has one or more slots for holding one or more expansion adapters, comprising:
means for detecting insertion of said expansion adapter into said slot,
means for mechanically locking said expansion adapter in said slot in response to a detection signal from said detecting means,
means for supplying power to said adapter in response to a detection signal from said detecting means,
means for connecting said expansion adapter and said slot on a signal level in response to a detection signal from said detecting means,
means for exchanging predetermined information with said expansion adapter in response to a detection signal from said detecting means, and for modifying system configuration information of said computer based on said attribute information stored on said expansion adapter,
means for requesting removal of said expansion adapter from said slot,
means responsive to each said removal request for exchanging predetermined information with said expansion adapter to modify system configuration information of said computer,
means for blocking signal communication paths between said expansion adapter and said computer, via said slot, in response to said request, means for shutting down power supply to said expansion adapter in response to said request, and means for releasing mechanical locking of said expansion adapter relative to said slot in response to said request.

17. A method for system reconfiguration of a computer that has one or more slots for holding one or more expansion adapters, comprising steps of:

detecting insertion of said expansion adapter into said slot, mechanically locking said inserted adapter in said slot in response to detecting said insertion, supplying power to said expansion adapter in response to detecting said insertion, connecting said expansion adapter and said slot for interchange of information signals in response to detecting said insertion, exchanging predetermined information between said inserted adapter and said computer, via said slot, in response to detecting said insertion, and modifying system configuration information of said computer based on attribute information stored in said expansion adapter and transferred to said computer in said exchanging step, requesting removal of an inserted said adapter from a said slot, exchanging predetermined information with said adapter in response to said request, modifying system configuration information of said computer in response to said exchanged information, blocking signal communication between said expansion adapter and said computer via said slot, in response to said request, shutting down power supply to said expansion adapter in response to said request, and releasing mechanical locking of said expansion adapter relative to said slot in response to said request.

18. A program driven arrangement for controlling dynamic reconfiguration of a computer system having one or more expansion slots for holding one or more expansion adapters, said arrangement comprising:

means integral to said computer system, and operable at any time, while said system is powered up and in use, for invoking and interpreting a configuration controlling program in response to actions occurring during insertion and removal of expansion adapters at any said expansion slot; and configuration means invocable and interpretable by said integral means; said configuration means containing said configuration controlling program; said configuration controlling program, when interpreted by said integral means, directing said computer system to perform a predetermined sequence of reconfiguring functions relative to the system formed by the computer system and expansion adapters of various types attached to said expansion slots, said configuration means including means for directing an exchange of predetermined information between said computer and an adapter in response to insertion of the adapter into a said expansion slot, or in response to a signal from a user of the respective computer system indicating intent to remove an adapter from a said expansion slot, said predetermined information including attribute information, defining attributes of the adapter being inserted or removed, which is needed by said integral means to locate and/or modify configuration information stored in said computer system in association with the respective said expansion slot into which a said adapter is being inserted or containing a said adapter intended to be removed.

19. A reconfiguring arrangement in accordance with claim 18, wherein:

said computer system receives a predetermined interruption when a said adapter is being inserted into a said expansion slot or when a said user of said system signals intent to remove a said adapter from a said slot and wherein said received interruptions prompt said computer system to transfer control of said computer system to said integral means and said configuration means.

* * * * *